(12) United States Patent
Tanikawa

(10) Patent No.: US 6,543,597 B2
(45) Date of Patent: Apr. 8, 2003

(54) CLUTCH DEVICE FOR AN AUTOMATIC TRANSMISSION

(75) Inventor: Naoya Tanikawa, Nagoya (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 96 days.

(21) Appl. No.: 09/809,185

(22) Filed: Mar. 16, 2001

(65) Prior Publication Data
US 2001/0035328 A1 Nov. 1, 2001

(30) Foreign Application Priority Data
Mar. 21, 2000 (JP) .................................. 2000-078037

(51) Int. Cl.⁷ ............................................. F16D 25/063
(52) U.S. Cl. .................................. 192/87.11; 192/106 F
(58) Field of Search ...................... 192/87.11, 87.15, 192/106 F

(56) References Cited

U.S. PATENT DOCUMENTS

| 3,710,650 A | * | 1/1973 | Piret ...................... 192/87.11 |
| 3,747,727 A | * | 7/1973 | Dach et al. ................ 138/115 |
| 3,970,176 A | * | 7/1976 | Bucksch .................... 192/18 A |
| 5,542,517 A | * | 8/1996 | Peruski .................... 192/106 F |
| 5,887,690 A | * | 3/1999 | Haupt ..................... 192/106 F |

FOREIGN PATENT DOCUMENTS

| JP | 10-131984 | 5/1998 |
| JP | 11-153152 | 6/1999 |

* cited by examiner

Primary Examiner—Jack Lavinder
Assistant Examiner—Bradley King
(74) Attorney, Agent, or Firm—Burns, Doane, Swecker & Mathis, LLP

(57) ABSTRACT

A clutch device for an automatic transmission includes an input member, a first output member, a second output member, a first clutch mechanism formed between the input member and the first output member, a first piston movable in a first axial direction for engaging the first clutch mechanism to transmit rotation torque from the input member to the first output member by receiving oil pressure, and a second clutch mechanism formed between the input member and the second output member radially outwardly of the first clutch mechanism. The first clutch mechanism and the second clutch mechanism are located in axially overlapping relation to each. A second piston is movable toward the second axial direction that is inverse to the first axial direction for engaging the second clutch mechanism to transmit rotation torque from the input member to the second output member by receiving oil pressure.

6 Claims, 2 Drawing Sheets

CLUTCH DEVICE FOR AN AUTOMATIC TRANSMISSION

This application is based on and claims priority under 35 U.S.C. §119 with respect to Japanese Application No. 2000-078037 filed on Mar. 21, 2000, the entire content of which is incorporated herein by reference.

FIELD OF THE INVENTION

The present generally relates to automatic transmissions. More particularly, the present invention pertains to a clutch device for an automatic transmission.

BACKGROUND OF THE INVENTION

Generally speaking, an automatic transmission transmits rotational torque from a torque converter disposed on the engine side to a member disposed on the wheel side via a gear train having a carrier, a sun gear, a pinion gear and a ring gear, a brake device and a clutch device. The clutch device transmits the rotational torque from an input member to an output member through engagement of friction plates disposed opposite to each other. Upon disengagement of the friction plates, the clutch device does not transmit rotational torque from the input member to the output member. The engaging or disengaging operation of the clutch device is executed when the shift position of the automatic transmission changes.

Figure 2:
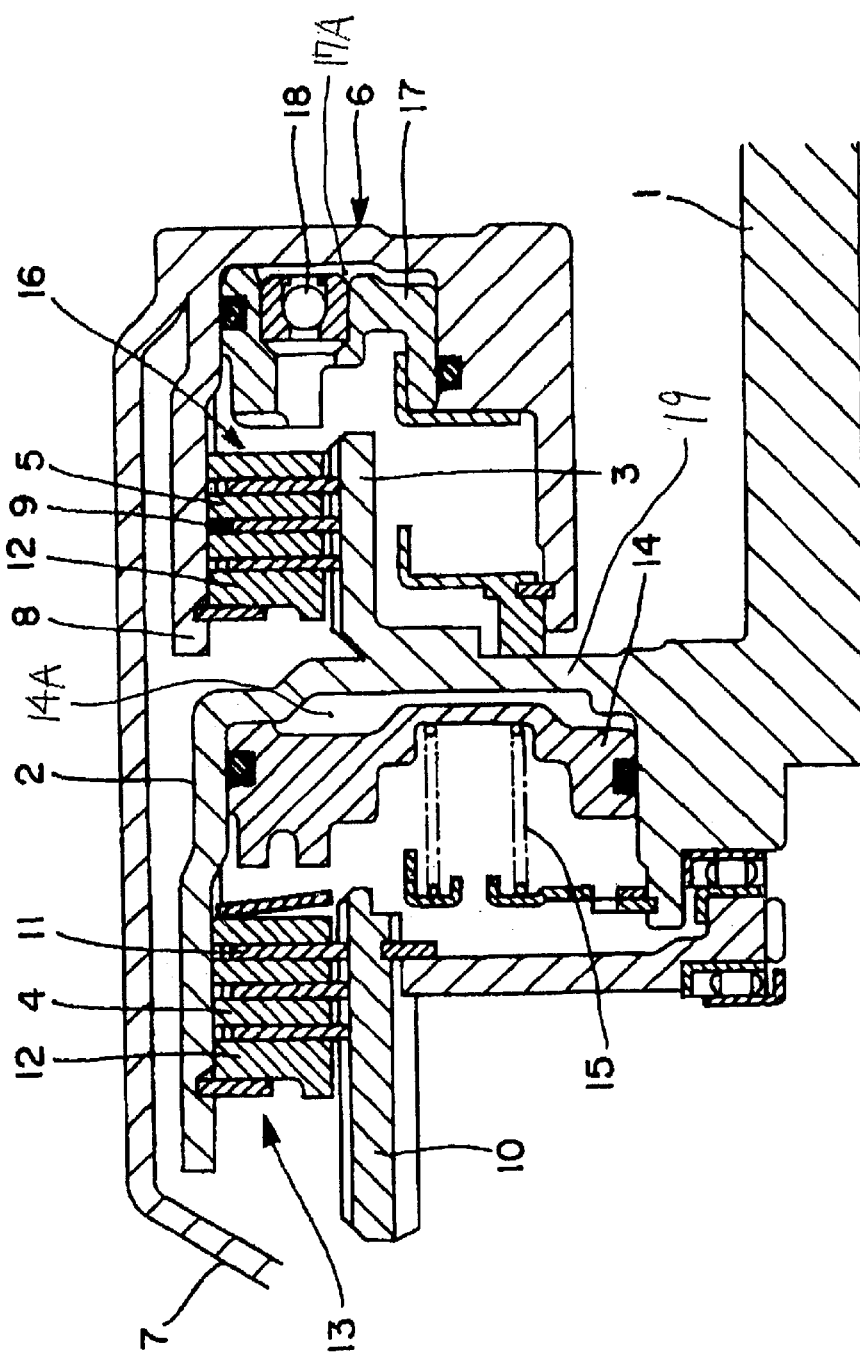

FIG. 2 is a cross-sectional view of a known clutch device. The clutch device has an input member 1 forming a wall portion 19 extending toward the outside in the radial direction. An axially extending input drum portion 2 and an axially extending input hub portion 3 are formed on the wall portion 19. The outer edge of each of a plurality of first friction plates 4 is fixed to the inner surface of the input drum portion 2. In addition, the inner edge of each of a plurality of second friction plates 9 is fixed to the outer surface of the input hub portion 3. The input hub portion 3 is surrounded by an output side cylindrical member 6. The output side cylindrical member 6 has a second output portion 7 and an output drum portion 8 extending toward the axial direction. The outer edge of each of a plurality of fourth friction plates 5 is fixed to the inner surface of the output drum portion 8. A first output member 10 is disposed in the inside radial direction of the input drum portion 2. The inner edge of each of a plurality of third friction plates 11 is fixed to the outer surface of the first output member 10. The illustrated clutch device also includes a thrust force receiving plate 12 which receives a thrust force.

The first friction plates 4 and the third friction plates 11 form a first clutch mechanism 13. A first piston 14 is disposed in the input drum portion 2 for effecting engagement of the first friction plates 4 with the third friction plates 11. The first piston 14 is pressed toward the right by a spring 15. The second friction plates 9 and the fourth friction plates 5 form a second clutch mechanism 16. A second piston 17 is disposed inside the output side cylindrical member 6 for effecting engagement of the second friction plates 9 with the fourth friction plates 5. A check valve 18 formed in the second piston 17 discharges centrifugal oil pressure into an oil chamber 17A between the second piston 17 and the output side cylindrical member 6. Therefore, the second clutch mechanism 16 under the engaging condition can be smoothly changed or switched to the disengaging condition.

Another oil chamber 14A is formed between the wall portion 19 and the first piston 14. When oil is supplied to the oil chamber 14A (first oil chamber) by the oil circuit, the first piston 14 moves in the leftward direction in FIG. 2 against the pressing force of the spring 15. Accordingly, the first friction plates 4 engage the third friction plates 11, and the rotational torque of the input member 1 is transmitted to the first output member 10. When the oil in the first oil chamber 14A is discharged, the first friction plates 4 disengage from the third friction plates 11, and the rotational torque of the input member 1 is not transmitted to the first output member 10.

When oil is supplied to the second oil chamber 17A by the oil circuit, the second piston moves toward the left in FIG. 2. Accordingly, the second friction plates 9 engage the fourth friction plates 5, and the rotational torque of the input member 1 is transmitted to the second output member 7. When the oil in the second oil chamber 17A is discharged, the second friction plates 9 are disengaged from the fourth friction plates 5, and the rotational torque of the input member 1 is not transmitted to the second output member 7.

Japanese Laid-Open Publication No. Hei 10-131984 also discloses a clutch device for an automatic transmission in which a first clutch mechanism and a second clutch mechanism are disposed in series in the same axial direction.

However, in the known construction shown in FIG. 2, because the pistons 14, 17 are disposed in series in the axial direction and are moved toward the same direction when the clutch mechanisms 13, 16 are engaged, the length of the clutch device in the axial direction is rather large. Furthermore, because the input member 1 is surrounded by the second output member 7, it is not possible to form a gear on the outer surface of the input member 1.

Japanese Laid-Open Publication No. Hei 11-153152 describes a clutch device for an automatic transmission in which the first clutch mechanism and the second clutch mechanism are disposed on a plane which is perpendicular to the axis of the automatic transmission. In this clutch device, the input member has a wall portion extending toward the outside in the radial direction. A hub portion and a drum portion extending in the axial direction are integrally formed on the wall portion. A first piston is disposed between the hub portion and the wall portion, and a second piston is disposed between the hub portion and the drum portion. With this construction of the clutch device, the structure of the first piston and the second piston is relatively complicated. Furthermore, because the receiving areas of the pistons which receive oil pressure are large, the quantity of oil required to operate the pistons is rather large. Accordingly, the time consumed by the piston operation varies. This can generate shock when the shift position of the automatic transmission is changed.

A need thus exists for a clutch device for an automatic transmission that is not as susceptible to the foregoing drawbacks and disadvantages.

SUMMARY OF THE INVENTION

The present invention provides a clutch device for an automatic transmission that includes an input member, a first output member, a second output member, a first clutch mechanism formed between the input member and the first output member, a first piston movable in a first axial direction for engaging the first clutch mechanism to transmit rotation torque from the input member to the first output member by receiving oil pressure, and a second clutch mechanism formed between the input member and the second output member radially outwardly of the first clutch mechanism. The first clutch mechanism and the second clutch mechanism are located in axially overlapping relation to each. A second piston is movable toward the second axial direction that is inverse to the first axial direction for engaging the second clutch mechanism to transmit rotation torque from the input member to the second output member by receiving oil pressure.

According to another aspect of the invention, a clutch device for an automatic transmission includes an input member having an input hub portion and an input drum portion which together establish an annular space, a first output member having a first output drum portion extending in an axial direction in the annular space, a second output member having a second output drum portion disposed between the input drum portion and the first output drum portion and extending in the axial direction in the annular space, a first clutch mechanism for effecting engagement and disengagement between the input hub portion and the first output drum portion, and a second clutch mechanism for effecting engagement and disengagement between the input drum portion and the second output drum portion. A first piston is movable along the inner surface of the first output drum portion for effecting operation of the first clutch mechanism, while a movable second piston is guided by the inner surface of the input drum portion and the outer surface of the input hub portion for effecting operation of the second clutch mechanism. The first and second pistons move in inverse directions to effect engagement of the first and second clutch mechanisms, respectively.

According to another aspect of the invention, an automatic transmission clutch device includes an input member having an input hub portion and an input drum portion, a first output member having a first output drum portion, a second output member having a second output drum portion, a first clutch mechanism for effecting engagement and disengagement between the input hub portion and the first output drum portion, and a second clutch mechanism for effecting engagement and disengagement between the input drum portion and the second output drum portion, with at least a portion of the second clutch mechanism axially overlapping at least a portion of the first clutch mechanism. A movable first piston operable by oil pressure is adapted to effect operation of the first clutch mechanism, and a movable second piston operable by oil pressure is adapted to effect operation of the second clutch mechanism. The first and second pistons move in opposite directions to effect engagement of the first and second clutch mechanisms, respectively.

BRIEF DESCRIPTION OF THE DRAWING FIGURES

Figure 1:
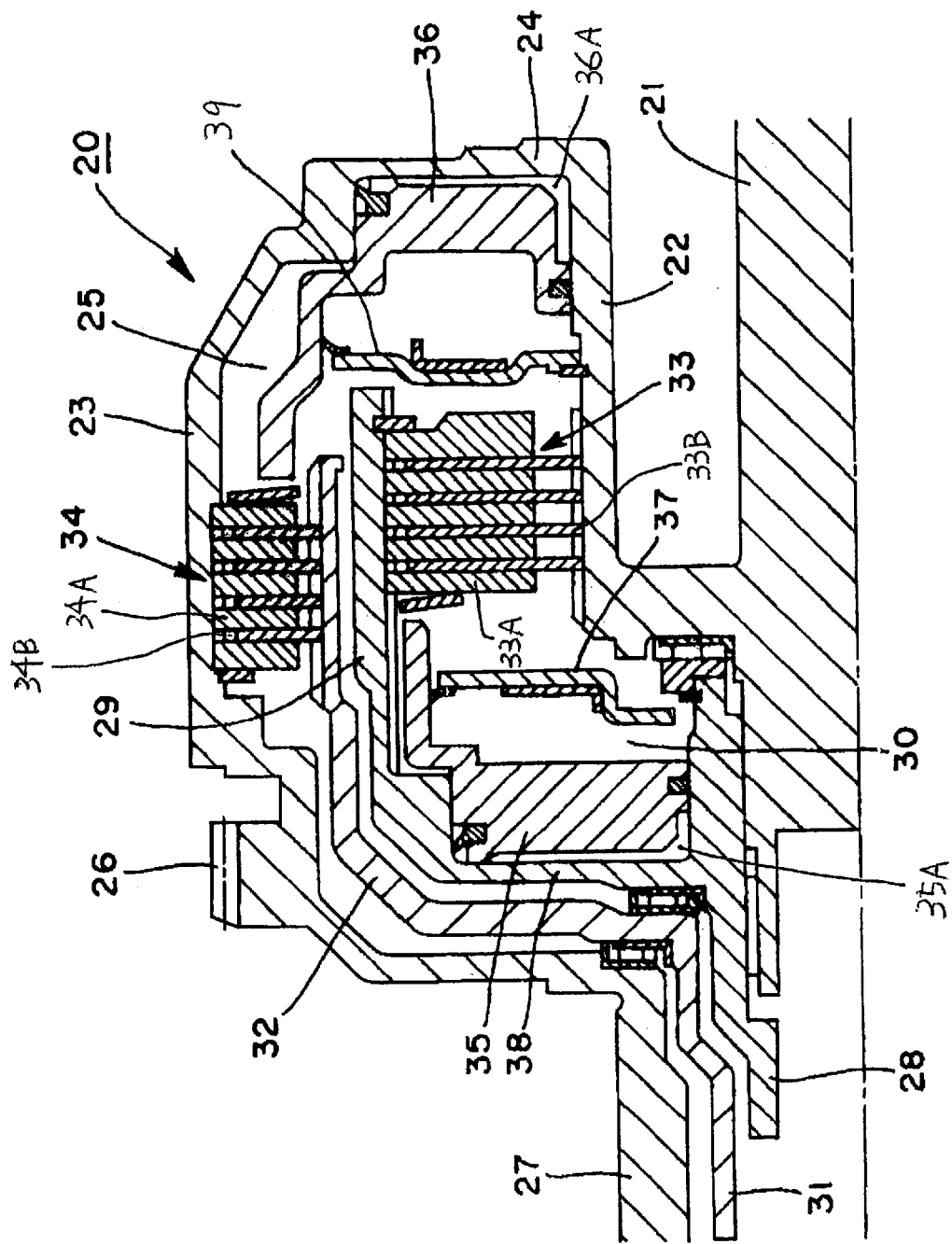

The foregoing and additional features of the present invention will become more apparent from the following detailed description considered with reference to the accompanying drawing figures in which like elements are designated by like reference numerals and wherein:

FIG. 1 is a cross-sectional view of a clutch device for an automatic transmission in accordance with the present invention; and FIG. 2 is a cross-sectional view of a known clutch device for an automatic transmission.

DETAILED DESCRIPTION OF THE INVENTION

Referring to FIG. 1, a clutch device 20 for an automatic transmission in accordance with the present invention includes an input member 21 forming an axially extending input hub portion 22 and an input drum portion 23. The input drum portion 23 is spaced from the input hub portion 22 in the outer radial direction. A first cylindrical space 25 is thus established between the input hub portion 22 and the input drum portion 23.

A gear 26 is formed on the outer surface of the input drum portion 23. A third output portion 27 which is coaxial with the input member 21 is integrally formed with the end of the input drum portion 23.

A first output member 28 is rotatable with respect to the input member 21. The first output member 28 forms a first output drum portion 29 which is disposed outside the first output member 28 and extends in the axial direction into the first cylindrical space 25. A second cylindrical space 30 is established between the first input drum portion 29 and the first output member 28.

A second output member 31 is disposed between the first output member 28 and the third output portion 27. The second output member 31 has a second output drum portion 32 disposed between the input drum portion 23 and the first input drum portion 29.

A first clutch mechanism 33 is formed between the input hub portion 22 and the first input drum portion 29. The first clutch mechanism 33 includes a plurality of output side first friction plates 33A fixed to the inner surface of the first output drum portion 29, and a plurality of input side first friction plates 33B fixed to the outer surface of the input hub portion 22.

Furthermore, a second clutch mechanism 34 is formed between the input drum portion 23 and the second output drum portion 32. The second clutch mechanism 34 includes a plurality of input side second friction plates 34A fixed to the inner surface of the input drum portion 23 and a plurality of output side second friction plates 34B fixed to the outer surface of the second output drum portion 32.

A movable first piston 35 which moves for operating the first clutch mechanism 33 is disposed in the second cylindrical space 30 and is surrounded by the first output drum portion 29. The first piston 35 is movable along or relative to the inner surface of the first output drum portion 29 and is adapted to press the output side first friction plates 33A to engage the output side first friction plates 33A with the input side first friction plates 33B. A movable second piston 36 which moves for operating the second clutch mechanism 34 is disposed in the first cylindrical space 25 and is surrounded by the input drum portion 23. The second piston 36 is generally guided by the inner surface of the input drum portion 23 and the outer surface of the input hub portion 22. The second piston 36 is adapted to press the input side second friction plates 34A to engage the input side second friction plates 34A with the output side second friction plates 34B.

An explanation of the oil pressure circuit which supplies oil pressure to the clutch device 20 for moving the first piston 35 and the second piston 36 is not described in detail as the oil pressure circuit is conventional and known in the art. The clutch device 20 also includes a first balance plate 37 and a second balance plate 39. The first balance plate 37 is disposed in the second cylindrical space 30 and the second balance plate 39 is disposed in the first cylindrical space 25. The centrifugal oil pressure applied between the first balance plate 37 and the first piston 35 is equal to the centrifugal oil pressure applied to the first oil chamber 35A because the centrifugal force applied to the oil in the space between the first balance plate 37 and the first piston 35 and the centrifugal force applied to the oil in the first oil chamber 35A are equal. Similarly, the centrifugal oil pressure applied between the second balance plate 39 and the second piston 36 is equal to the centrifugal oil pressure applied to the second oil chamber 36A because the centrifugal force applied to the oil in the space between the second balance plate 39 and the second piston 36 and the centrifugal force applied to the oil in the second oil chamber are equal.

A ring shaped first wall portion 38 is formed between the inner part of the first output member 28 and the first output drum portion 29 to connect the inner part of the first output member 28 and the first output drum portion 29. A ring shaped second wall portion 24 is formed between the input hub portion 22 and the input drum portion 23 to connect the input hub portion 22 and the input drum portion 23 with respect to the radial direction. The configuration of the second piston 36 is relatively simple because the second piston 36 is disposed to move in a direction opposite the direction of movement of the first piston 35. If the clutch device were designed so that both pistons move in the same direction, the second piston 36 would have to be larger in the axial and radical directions to avoid the operational influence of the first piston. With the present invention, the two pistons 35, 36 move in opposite directions and so the size and configuration of the second piston 36 can be simplified.

As further shown in FIG. 1, the first clutch mechanism 33 and the second clutch mechanism 34 are disposed in overlapping relation to each other with respect to the axial direction. Further, the second clutch mechanism 34 is disposed radially outward relative to the first clutch mechanism 33. When the first and second clutch mechanisms 33, 34 are engaged, the moving direction of the first piston 35 is inverse or opposite to the moving direction of the second piston 36. Therefore, it is possible to shorten the axial length of the clutch device 20. Furthermore, the position and configuration of the first piston 35 and the second piston 36 need not be regulated with respect to each other because the moving direction of the first piston 35 is the reverse of the moving direction of the second piston 36. Accordingly, the configuration of the first and second pistons 35, 36 can be simplified.

In FIG. 1, the rotation torque from the input member 21 is directly transmitted to the third output portion 27 because the third output portion 27 is formed as an integral and unitary, one-piece element with the input member 21. When oil pressure is supplied to a first oil chamber 35A defined between the first piston 35 and the first wall portion 38, the first piston 35 moves toward the right in FIG. 1, and the first clutch mechanism 33 is engaged. The rotation torque from the input member 21 is thus transmitted to the first output member 28. When oil pressure is supplied to a second oil chamber 36A defined between the second piston 36 and the second wall portion 24, the second piston 36 moves toward the left in FIG. 1, and the second clutch mechanism 34 is thus engaged. The rotation torque from the input member 21 is thus transmitted to the second output member 31.

It is possible to release the transmission of the rotation torque from the input member 21 to the first output member 28 or the second output member 31 by discharging the oil from the first oil chamber 35A or the second oil chamber 36A. As the oil is discharged from the first oil chamber 35A, the centrifugal oil pressure in the space between the first balance plate 37 and the first piston 35 generated by the rotation of the input member 21 causes the first piston 35 to move leftward, thus facilitating the smooth discharge of oil from the first oil chamber 35A. Similarly, as the oil is discharged from the second oil chamber 36A, the centrifugal oil pressure in the space between the second balance plate 39 and the second piston 36 resulting from rotation of the input member 21 causes the second piston 36 to move rightward, thus facilitating the smooth discharge of oil from the second oil chamber 36A. Accordingly, the centrifugal oil pressure on the clutch mechanism 33, 34 is relatively low.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A clutch device for an automatic transmission comprising:

an input member having an input hub portion and an input drum portion which together establish an annular space;

a first output member having a first output drum portion extending in an axial direction in the annular space;

a second output member having a second output drum portion disposed between the input drum portion and the first output drum portion and extending in the axial direction in the annular space;

a first clutch mechanism for effecting engagement and disengagement between the input hub portion and the first output drum portion;

a second clutch mechanism for effecting engagement and disengagement between the input drum portion and the second output drum portion;

a first piston movable along an inner surface of the first output drum portion for effecting operation of the first clutch mechanism;

a movable second piston guided by an inner surface of the input drum portion and an outer surface of the input hub portion for effecting operation of the second clutch mechanism; and the first and second pistons moving in opposite directions to effect engagement of the first and second clutch mechanisms, respectively.

2. The clutch device for an automatic transmission according to claim 1, wherein the first clutch mechanism includes a plurality of input side first friction plates fixed to the input hub portion and a plurality of output side first friction plates fixed to the first output drum portion, and the second clutch mechanism includes a plurality of input side second friction plates fixed to the inner surface of the input drum portion and a plurality of output side second friction plates fixed to the second output drum portion.

3. The clutch device for an automatic transmission according to claim 1, including a first balance plate disposed opposite to the first piston with respect to the axial direction and receiving centrifugal oil pressure equal to the centrifugal oil pressure received by the first piston, and a second balance plate disposed opposite to the second piston with respect to the axial direction and receiving centrifugal oil pressure equal to the centrifugal oil pressure received by the second piston.

4. The clutch device for an automatic transmission according to claim 1, including a gear formed on an outer surface of the input drum portion.

5. The clutch device for an automatic transmission according to claim 1, wherein the input member, the first output member and the second output member are disposed coaxially.

6. The clutch device for an automatic transmission according to claim 1, including a third output portion coaxial with the input member and integrally formed at an end of the input drum portion.

* * * * *